US008013555B2

(12) United States Patent
Thornell-Pers

(10) Patent No.: US 8,013,555 B2
(45) Date of Patent: Sep. 6, 2011

(54) DRIVE SYSTEM FOR A TAP CHANGER

(75) Inventor: Christer Thornell-Pers, Västerås (SE)

(73) Assignee: ABB Research Ltd., Zürich (CH)

( * ) Notice: Subject to any disclaimer, the term of this patent is extended or adjusted under 35 U.S.C. 154(b) by 376 days.

(21) Appl. No.: 12/438,581

(22) PCT Filed: Aug. 24, 2007

(86) PCT No.: PCT/SE2007/050579
§ 371 (c)(1),
(2), (4) Date: Feb. 24, 2009

(87) PCT Pub. No.: WO2008/024068
PCT Pub. Date: Feb. 28, 2008

(65) Prior Publication Data
US 2010/0241286 A1 Sep. 23, 2010

(30) Foreign Application Priority Data

Aug. 25, 2006 (SE) ........................ 0601756

(51) Int. Cl.
*H02P 7/00* (2006.01)
(52) U.S. Cl. .......... 318/432; 318/433; 318/442; 363/34; 363/35
(58) Field of Classification Search .................. 363/15, 363/34, 35; 318/145, 146, 151, 152, 153, 318/432, 433, 442
See application file for complete search history.

(56) References Cited

U.S. PATENT DOCUMENTS

| 5,479,557 | A | * | 12/1995 | Ganz et al. | 388/829 |
| 5,886,422 | A | | 3/1999 | Mills | |
| 6,476,315 | B2 | * | 11/2002 | Ganz | 136/244 |
| 6,710,574 | B2 | * | 3/2004 | Davis et al. | 318/800 |
| 2002/0000785 | A1 | * | 1/2002 | Ganz | 320/101 |

FOREIGN PATENT DOCUMENTS

| EP | 0695024 A2 | 1/1996 |
| JP | 2003015747 A | 1/2003 |
| WO | WO-00/74198 A1 | 12/2000 |
| WO | WO-03044939 A1 | 5/2003 |

OTHER PUBLICATIONS

PCT/ISA/210—International Search Report—Nov. 15, 2007.
PCT/IPEA/409—International Preliminary Report on Patentability—Sep. 23, 2008.
PCT/IPEA/408—Written Opinion of the International Preliminary Examining Authority—Jun. 24, 2008.

* cited by examiner

*Primary Examiner* — Adolf Berhane
*Assistant Examiner* — Nguyen Tran
(74) *Attorney, Agent, or Firm* — Venable LLP; Eric J. Franklin

(57) ABSTRACT

A drive system for operation of a tap changer for voltage regulation of a transformer on load. An electric motor is connectible to a movable part of the tap changer for moving the movable part for carrying out a tap change operation. An electric converter connects an electric power supply to the electric motor. A control arrangement is adapted to control the electric converter for controlling the operation of the motor and by that of the tap changer.

26 Claims, 3 Drawing Sheets

DRIVE SYSTEM FOR A TAP CHANGER

CROSS-REFERENCE TO RELATED APPLICATIONS

This application claims priority to Swedish patent application 0601756-0 filed 25 Aug. 2006 and is the national phase under 35 U.S.C. §371 of PCT/SE/2007/050579 filed 24 Aug. 2007.

TECHNICAL FIELD OF THE INVENTION

The present invention relates to a drive system for operation of a tap changer for voltage regulation of a transformer on load, said system comprising an electric motor connectible to a movable part of a said tap changer for moving this for carrying out a tap change operation, means for connecting the electric motor to an electricity power supply for the operation thereof as well as an arrangement for controlling the operation of the motor and by that of said tap changer, said system comprising an electric converter for connection of said power supply to said electric motor therethrough and said control arrangement being adapted to control said electric converter for controlling the operation of the motor.

This type of tap changer is among technicians called on-load-tap-changers since they are used for regulating a voltage on the output of a transformer while this is connected to a load. They are normally used for keeping the voltage out from the transformer constant irrespectively of the magnitude of said load, so that a larger part of said secondary winding or windings of the transformer is by said tap changer controlled to be tapped when the load (power consumption) is higher on for instance a power transmission network connected to said transformer. Appended FIG. 1 schematically illustrates an example of a use of a tap changer with drive system according to the introduction without restricting the invention to this particular application. Only one 1 of three secondary windings of a transformer 2 immersed in an oil bath 3 is indicated. It is also indicated how a generator 4 of electric power is connected to the primary windings of the transformer as indicated at 5. The secondary windings of the transformer are connected to a network 6 for transmission of electric power, here a high voltage alternating current network. However, it is also possible that secondary windings of the transformer are connected to one or several converters, such as current source or voltage source converters, for converting the voltage into a direct voltage for a High Voltage Direct Current transmission line.

A tap changer 7 is very schematically indicated and adapted to change the position of one 7' of the two voltage tap points of each secondary winding of the transformer, so that the number of the turns tapped of each such secondary winding may be varied from about 90% to 100% by operation of said tap changer. A drive system 8 connected to an electricity power supply 9 and having an electric motor not shown for rotating a shaft 10 is arranged outside the oil bath container 11. The tap changer 7 will in this way be controlled through a shaft system 12 for carrying out tap change operations. Said tap changer has to maintain a tap point connection to the output of the transformer throughout the tap change operation, which is obtained through switching sequences well known within the art while using resistors for keeping short circuit currents at a low level during periods of time when windings are short-circuited. Thus, when the load on said network 6 is increased the tap changer 7 is through the drive system 8 controlled to change the tap position thereof for tapping a larger part of the secondary winding of the transformer.

BACKGROUND ART

Appended FIG. 2 is used for explaining how drive systems of a known type are constructed and operate. It is shown how the drive system comprises an electric motor 13, such as an asynchronous motor, which is connected to an electricity power supply 9 in the form of an electric power network, which typically may have a voltage of 90 VDC-400 VDC or 100 VAC-300 VAC. The system also comprises means 14 for controlling the operation of the motor by controlling relays 15 connecting the power supply 9 directly to the motor 13. It is also shown how the output shaft 16 of the motor is connected to a gear 17 connecting to a shaft 18 of a said shaft system. This drive system also comprises a mechanical brake 19 for stopping the motor at the end of a tap change operation.

This drive system has a number of shortcomings. Each new such drive system has to be custom made for the current type of tap changer, since each type of drive system is only compatible with one type of tap changer and the specific power supply voltage, which is dependent on the end customer, normally in which country the tap changer is to be used. This means that each new such drive system has a dedicated tap changer and a dedicated customer from the very beginning, which makes stocking of complete drive systems inefficient, in turn leading to long delivery times. These circumstances also force the manufacturer to keep a large amount of different components in stock for all different drive systems, which well may be a number of 20 different motors, relays, motor protectors etc. Furthermore, the mechanical brake used for stopping the movement at the end of each tap change operation requires regular service and adjustment, and it contributes to brake dust in the enclosure of the drive system, which in its turn may lead to failures in the electronic parts of the drive system.

JP 2003015747 discloses a drive system as defined in the introduction, which, however, does not address the problems mentioned above with respect to stocking of complete drive systems and keeping components for such systems in stock.

SUMMARY OF THE INVENTION

The object of the present invention is to provide a drive system of the type defined in the introduction, which at least reduces some of the problems mentioned above of such drive systems already known.

This object is according to the invention obtained by providing such a drive system, which further is characterized in that the system comprises means adapted to detect movement of the output shaft of the electric motor and the position of a movable part of the tap changer and means adapted to send information from this detecting means to said control arrangement, and that said control arrangement is on one hand computerised and on the other configurable and customisable prior to commissioning as well as in use for enabling adaption of the drive system to different voltage levels of a said power supply and to different properties of a tap changer to be operated by said drive system.

By in this way feeding the electric motor through an electric converter and controlling the operation of the motor by controlling the converter a so-called 4-quadrant drive system is obtained, as is possible also for the drive system according to JP 2003015747, which means that positive as well as negative torques may be applied on the output shaft of the electric motor, so that no mechanical brakes are necessary for stopping the movement of said movable part at the end of each tap change operation. Thus, the problems associated with the existence of such a mechanical brake are by that totally solved.

Of most importance is, however, that in the present invention, the presence of said detecting means and the computarisation of the control arrangement together with the possibility resulting therefrom to make this arrangement configurable and customisable prior to commissioning as well as in use, it will be possible to adapt the drive system to different voltage levels of a said power supply and to different properties of a tap changer to be operated thereby. This makes it possible to design the drive system so that it will fit all different types of tap changer and may be made compatible with all different voltages of said electricity power supply, since the control of the electric converter may be adapted to the different types of tap changer, and an adjustment to the actual electricity power supply voltage may be carried out by a combination of the control of said electric converter and a suitable preparation of the electric motor when manufactured or a connection of said electric converter to said power supply by suitable voltage adjustment means.

Thus, one common design of the drive system is obtained independent of the type of tap changer and customer, i.e. mostly dependent upon the country thereof, which enables stocking of such drive systems for delivery to any possible customer and by that shortens the delivery time of the drive system. It is only necessary to configure and customise the drive system for the respective intended operation conditions, such as making changes in the software of the control arrangement when the drive system is moved to another transformer. This is according to an embodiment of the invention made by adapting the control arrangement to receive a customer specific parameter file with information about properties of a tap changer to be operated by said system. Another advantage is that the design of the drive system may be more compact and costs may be saved.

It is pointed out that "to detect movement of the output shaft of the electric motor and the position of a movable part of the tap changer" is to be interpreted broadly and also covers indirect such detection by detecting something being a direct result of a said movement or something associated with said position. This may for instance be other movable parts connected to said shaft or tap changer.

According to an embodiment of the invention the system comprises a DC/DC-converter connected between said power supply and said electric converter and means for controlling said DC/DC-converter, and said DC/DC-converter and said means for control thereof are adapted to deliver a voltage of a substantially constant level to said electric converter substantially independently of the level of the voltage delivered by said electric power supply. This means that the electric converter of the drive system may always receive a voltage of the same level independently of to which customer the drive system is delivered, and the control of the electric converter may then be carried out for adjusting the drive system to the type of tap changer in question.

According to another embodiment of the invention the system is adapted to be connected to a said electric power supply delivering a voltage of 90 VDC-400 VDC or 100 VAC-300 VAC, and said DC/DC-converter is a boost converter adapted to deliver a voltage of a substantially constant level, such as being 350 V-450 V, preferably about 400 V, to said electric converter. This means that the electric converter may be provided with the same voltage independently of the customer to which the drive system is delivered, i.e. the voltage level prevailing of the electricity power supply used by that customer, which enables the use of a standard electric motor, such as asynchronous motor, from any suitable supplier.

According to another embodiment of the invention the system further comprises a Power Factor Correction converter connected between said power supply and said electric converter for ensuring that the system is tapping a smooth current from said electricity power supply, and it is preferred to include this Power Factor Correction property in said DC/DC-converter. Disturbances on said electric power supply as a consequence of the operation of the tap changer by said drive system are by this avoided, so that for instance in the case of an alternating voltage power supply it is ensured that a current with a smooth sinus shape is fed from the power supply to the drive system. This will eliminate or at least decrease the requirement of filters between the electricity supply and the electric motor.

According to another embodiment of the invention the system is adapted to be connected to an electricity power supply delivering an alternating voltage, and the system comprises a passive rectifier adapted to connect the system to said power supply. It is pointed out that the drive system according to the present invention may be used for all different supply voltages with respect to both levels thereof and the type thereof, direct voltage or alternating voltage. The drive system will automatically be adapted to the actual supply voltage.

According to another embodiment of the invention the system comprises means for measuring the current and the voltage delivered to said electric motor, means for calculating the instantaneous power or torque needed as well as the energy consumption during a tap change operation, means for storing the calculated values thus established and means for comparing said calculated values with such stored corresponding values and based on the result of this comparison determine whether there is any need of maintenance of any movable parts of said tap changer. It will by this measurement and comparison be possible to determine whether torques needed for carrying out tap change operations increases or decreases, which for instance may give valuable information about incipient wear of bearings. Such information about the status of the drive system will be communicated to a substation or other main computer. This means that failures are prevented by indicating mechanical worn-outs at an early stage enabling service before failure. Furthermore, it will not be necessary to replace critical mechanical components at fixed intervals, but this may instead be done when it is really needed resulting in a saving of costs, especially for labour, which may be substantial.

According to another embodiment of the invention said arrangement is adapted to control said electric converter for controlling the electric motor to obtain a micro motion of a said movable part of the tap changer, i.e. a motion thereof without carrying out a complete tap change operation, for checking the proper function of the system and/or tap changer. Such a micro motion is easy to carry out, in any direction and back to the start position, thanks to the control of the electric motor by the control of the electric converter, and the possibility to carry out such a control without carrying out a complete tap change operation is especially important in drive systems used for tap changer being inactive over longer periods of time, so that it is ensured that the tap changer will function properly once it has to operate. This information about the status of the drive system may also be communicated to a substation or any main computer.

According to another embodiment of the invention said detecting means comprises a rotating sensor connected to an output shaft of said electric motor for determining the position of a said movable part of the tap changer, and the rotating sensor is adapted to deliver information about said position to said control arrangement. The use of such a rotating sensor in combination with the control of said control arrangement of the electric converter and by that the electric motor makes it possible to obtain an absolute position measurement at the end of each tap change operation in a simple and cost efficient way contrary to expensive electromechanical devices used in known drive systems of this type.

According to an embodiment of the invention said rotating sensor is a resolver or an encoder, and in the case of a resolver this is connected to an output shaft of said electric motor so as to rotate substantially one turn while passing all possible tap change positions of the tap changer. Thus, the position of the resolver will then accurately and unambiguously indicate the tap change position in question. It should be noted that "connected to an output shaft of said electric motor" also comprises an indirect such connection, such as by means of a gear.

According to another embodiment of the invention said electric motor is an AC-motor, such as an asynchronous motor, a permanent excited synchronous motor, a brushless DC motor or a reluctance motor. An asynchronous motor is particularly advantageous, since it is a very robust, reliable and cheap motor requiring a minimum of services during its lifetime. Furthermore, the motor is well used for fixed and variable speed drives in various industrial applications.

According to an embodiment of the invention said AC-motor is controlled by controlling a said electric converter in the form of a Voltage Source Converter (VSC). Such a VSC-converter may have any controllable semiconductor devices of turn-off type, and IGBTs are one of such suitable power semiconductor devices.

According to another embodiment of the invention said control arrangement is adapted to control the VSC-converter according to a Pulse Width Modulation pattern for delivering an alternating voltage driving or braking the electric motor. This constitutes a suitable, reliable and simple way of controlling a tap change operation for all conceivable types of on load tap changers.

According to another embodiment of the invention said electric motor is a DC motor, such as a permanent excited direct current motor or a universal current motor. Thus, the drive system according to the invention opens up for the use of AC motors as well as DC motors, thanks to the arrangement of an electric converter for controlling the operation of the motor.

In the case of a DC motor said electric converter is according to another embodiment of the invention a Current Source Converter (CSC).

According to yet another embodiment of the invention the drive system is adapted for operation of a tap changer for voltage regulation of a transformer on load having a rated power of at least 800 kVA and/or a rated voltage of at least 11 kV. Drive systems according to the invention are suitable for on load tap changers used for voltage regulation of this type of "big" transformers.

The invention also relates to a use of a drive system according to the invention for carrying out tap change operations for voltage regulation of a transformer in a system for transmission or distribution of electric power, in which it is possible to benefit from the advantage characteristics of the drive system according to the invention, and in which it is important to be able to reliably keep the voltage out from the transformer at a substantially constant level independently of the load connected thereto. The transformer may then be connected to a generator of electric power and be a part of a power plant.

A preferable use of the drive system is for operation of a tap changer for voltage regulation of a transformer in a high voltage power transmission system, such as for High Voltage Direct Current or High Voltage Alternating Current. Said power transmission system may then be designed for voltages of 50 kV-1 000 kV.

Another suitable use of the drive system is for operation of a tap changer for voltage regulation of a transformer connected to a high power electric arc furnace.

Another suitable use of the drive system is for operation of a tap changer for voltage regulation of a transformer in a switch gear, such as within the industry, for regulating power supply arriving thereto from a power transmission or distribution line or network. Such a tap changer would accordingly advantageously be used within the industry, for example on the input side of an industry switch gear for regulating the power fed into the industry power network.

The present invention also relates to an electric power plant having a transformer with a tap changer drive system according to the present invention.

Further advantages as well as advantageous features of the invention appear from the following description.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
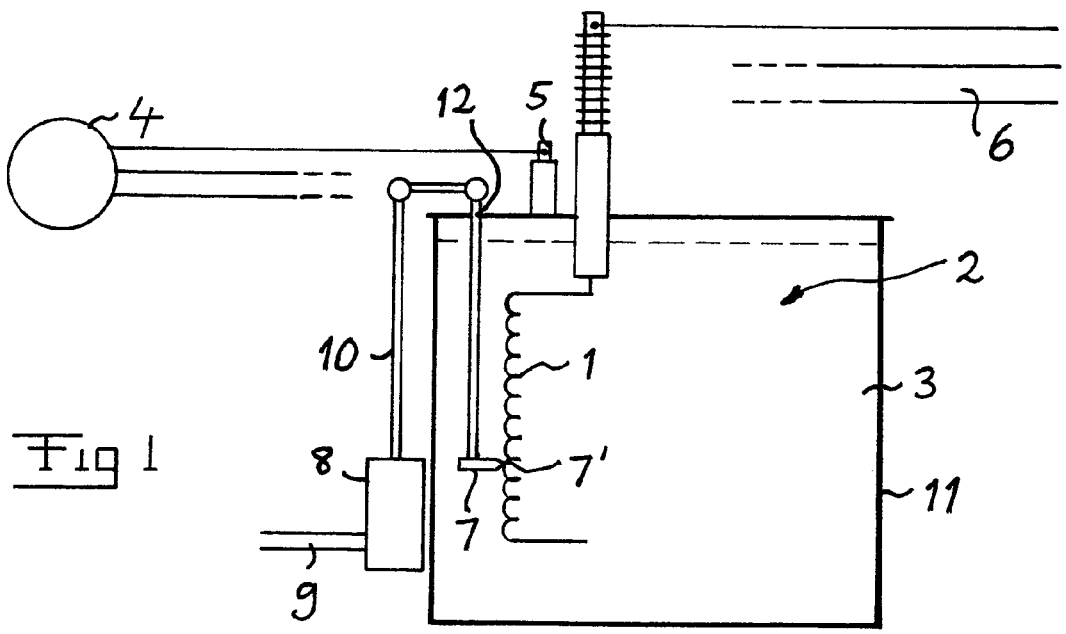
FIG. 1 is a very schematic view illustrating a possible use of a drive system for operation of a tap changer for voltage regulation of a transformer on load.
Figure 2:
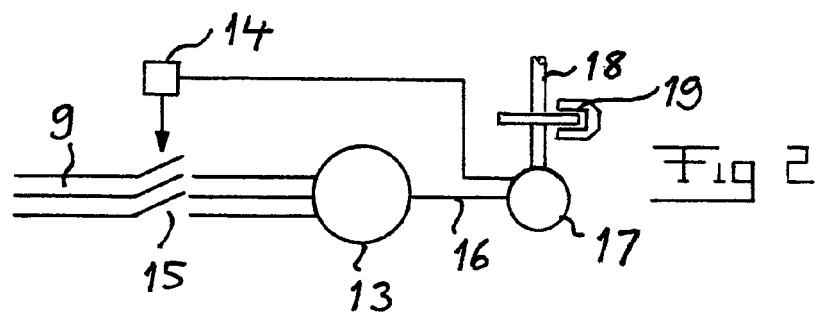
FIG. 2 is a schematic view illustrating a known drive system for a said operation of a tap changer.
Figure 3:
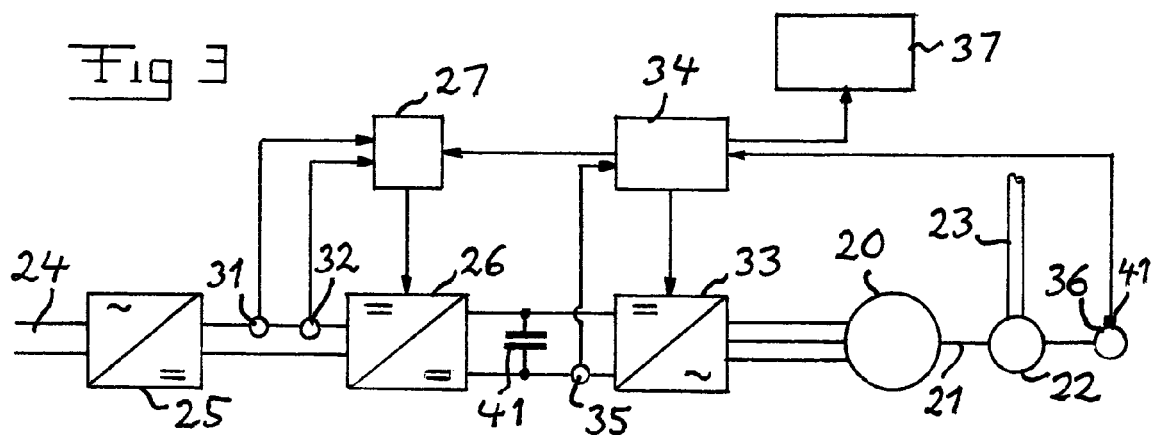
FIG. 3 is a schematic circuit diagram illustrating a drive system according to an embodiment of the present invention.

A drive system according to an embodiment of the invention is schematically illustrated in FIG. 3, and this comprises an electric motor 20 in the form of an asynchronous motor (a 4-pole machine is the most optimized machine looking at the power factor and physical size, although other machines, such as with 2, 6 or 8 poles are possible), the output shaft 21 of which is through a gear 22 connected to a movable part 23 of a shaft system for carrying out a tap change operation of a tap changer connected thereto. The asynchronous motor 20 is fed through an electricity power supply 24, which here is an alternating voltage power supply, but which may just as well deliver a direct voltage. The power supply 24 may for instance have a voltage of 90 VDC-400 VDC or 100 VAC-300 VAC.

Figure 4:
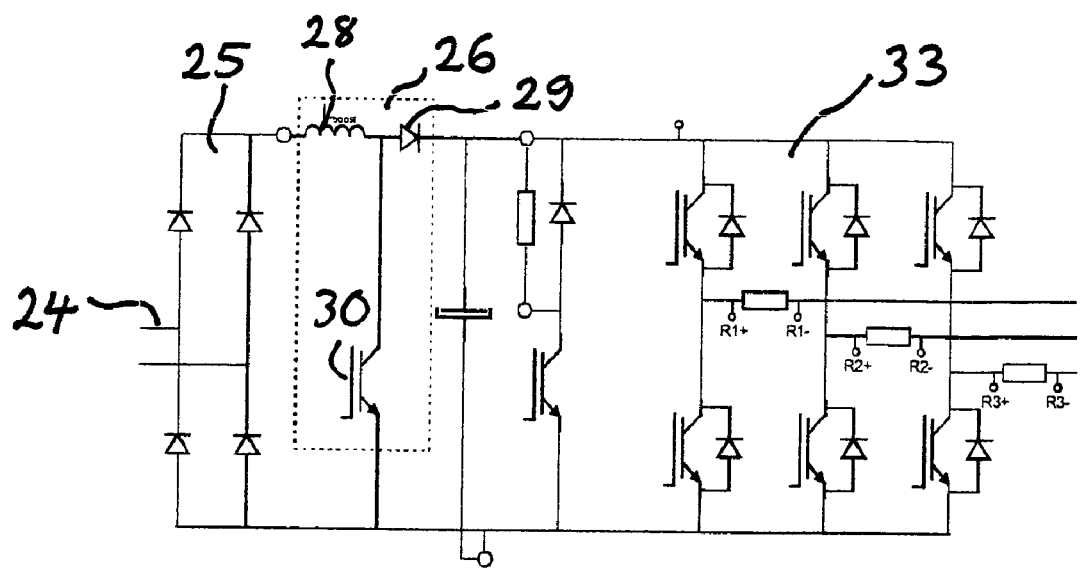
FIG. 4 is a circuit diagram illustrating a part of the drive system according to FIG. 3 in greater detail.

Reference is now also made to FIG. 4. The drive system comprises a passive rectifier 25 in the form of a diode rectifier for converting the alternating supply voltage into a direct voltage. The output of this rectifier is connected to a boost converter 26, which is a DC/DC-converter controlled by a control means 27 to obtain a voltage of a substantially constant level, such as 400 V, at the output thereof independently of the level of the voltage arriving from the power supply 24 through the rectifier 25. This boost converter is also provided with Power Factor Correction functionality which ensures that the current drawn from the power supply 24 has a substantially smooth sinus shape. A possible design of the boost converter is shown in FIG. 4 including an inductor 28 connected in series with a rectifier diode 29 and an IGBT 30 controlled by the control means 27 interconnecting a point between the inductor and the diode and a point at the other DC pole. Means 31, 32 are arranged for measuring the current and the voltage, respectively, supplied to the boost converter 26 and delivering information thereabout to the control means 27 for ensuring that this controls the boost converter to deliver a voltage of a substantially constant level on the output thereof. This fixed DC voltage on the input of the electric converter means that a standard 240 V Δ400 V Y asynchronous motor may be used for the whole supply voltage range and that the electric converter may be specified for one specific voltage.

The output of the boost converter 26 is connected to an electric converter 33 in the form of a VSC-converter controlled by a control arrangement 34 according to a Pulse Width Modulation pattern (PWM) to deliver an alternating voltage to the electric motor 20. FIG. 4 shows a conventional design of such a converter with valves of a semiconductor device of turn-off type, such as an IGBT or FET. The IGBTs of this converter will accordingly be controlled with a frequency being at least one order of magnitude higher, such as 20-40 times higher, than the frequency of the alternating voltage fed to the electric motor 20. It is pointed out that the DC/DC-converter 26 is preferably only enabled when a tap change operation is to be carried out, so that during the time between such operations the DC/DC-converter will be inactive, which in its turn results in a drop of the voltage in the intermediate link to the electric converter 33 to a voltage depending upon the supply voltage of the electricity power supply 24. This is primarily done for prolonging the life time of the semiconductor devices in the DC/DC-converter 26. When then starting the DC/DC-converter before a tap change operation the voltage increase per time unit is restricted for minimizing stress upon especially capacitors 41 of said intermediate link.

The system also comprises means 35 for measuring the current and voltage delivered to the electric motor, means integrated with said control arrangement 34 for calculating the instantaneous power or torque needed as well as the energy consumption during a tap change operation and for storing calculated values thus established and means for comparing said calculated values with such stored corresponding values and based on the result of this comparison determine whether there is a need of maintenance of any movable parts of the tap changer.

Figure 6:
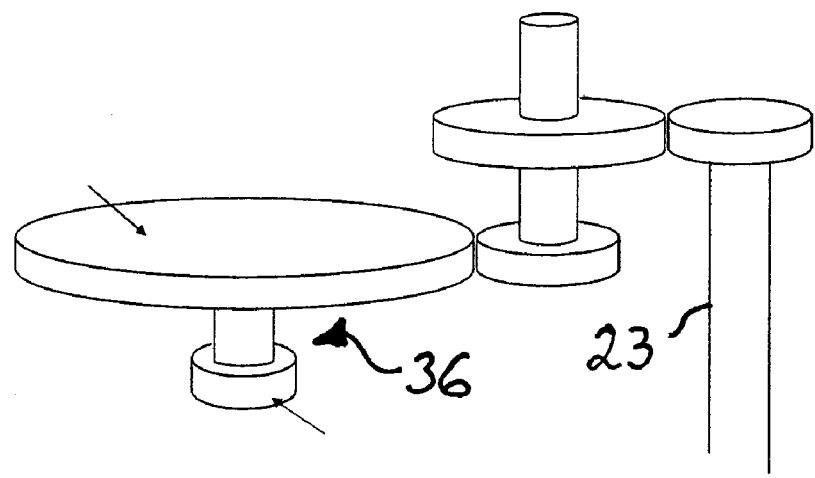
FIG. 6 is a perspective view illustrating a part of the drive system according to FIG. 3.

The output shaft 23 of the electric motor 20 from the gear 22 is connected to a rotating sensor in the form of a resolver 36 illustrated in FIG. 6. This resolver is through means 41 adapted to deliver information about the actual position of a movable part of the tap changer to said control arrangement 34 for ensuring that the control arrangement 34 controls the electric converter and by that the electric motor 20 and movable parts of the tap changer correctly at the end of a tap change operation. In the present case the tap changer has as many as 35 different contacts connected to different winding turns on the transformer in question. The shaft 23 will rotate one turn as the motor rotates 25 turns and it will rotate 5 turns during a tap change operation, while the resolver shaft will move only 10° during such a tap change operation. This means that the resolver 36 will rotate 350° for 35 such possible operations.

The control arrangement 34 may through an internal CAN be connected to a display unit 37 and I/O boards not shown for communication with a power station.

The drive system shown in FIG. 3 may be used for any levels of power supply voltage and type of tap changer to be operated thereby. The only adaption to make to the particular type of tap changer is to introduce a customer specific parameter file into the control arrangement informing this about the number of tap change positions of the tap changer and which language is to be used on the display unit. The control arrangement 34 will through control of the electric converter 33 control the electric motor 20 to deliver any torque, i.e. both positives and negatives, on the output shaft 21 thereof, so that no mechanical brake is needed for accurately stopping movable parts of the tap changer at the end of a tap change operation.

Figure 5:
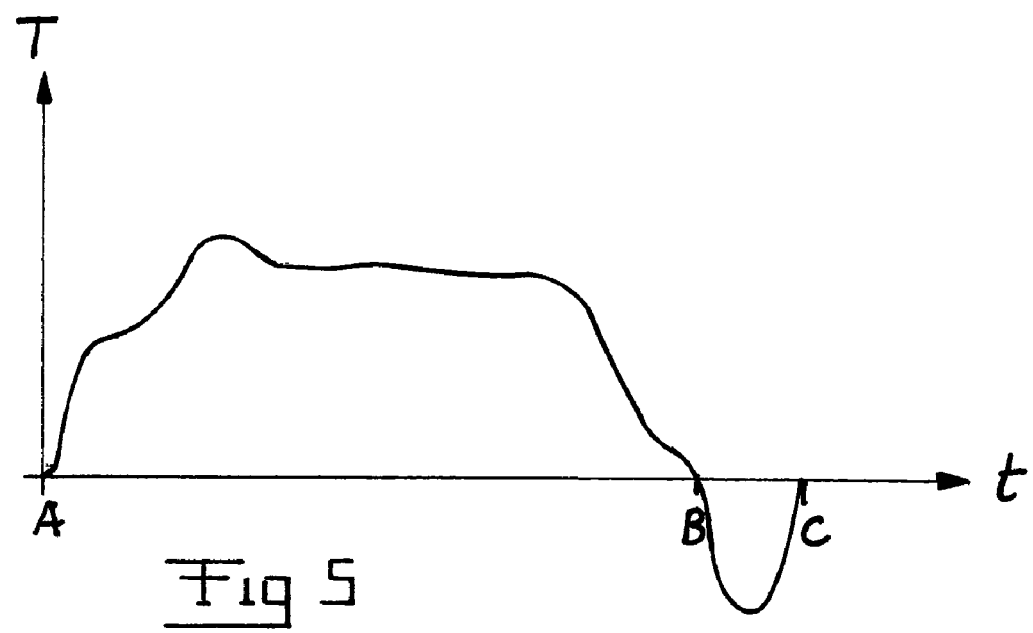
FIG. 5 is a simplified graph of the torque on the output shaft of an electric motor versus time when carrying out a tap change operation through a drive system of the present invention.

How the torque T may vary over the time t during a tap change operation is schematically and very simplified shown in FIG. 5. The tap change operation starts at the time A, in which the control arrangement 34 controls the converter 33 to start to control the electric motor 20 to deliver a positive torque for moving movable parts of the tap changer, and at the time B the motor 20 is through the converter 33 controlled to deliver a negative torque braking the output shaft 21 thereof until the tap change operation is completed at C.

Figure 7:
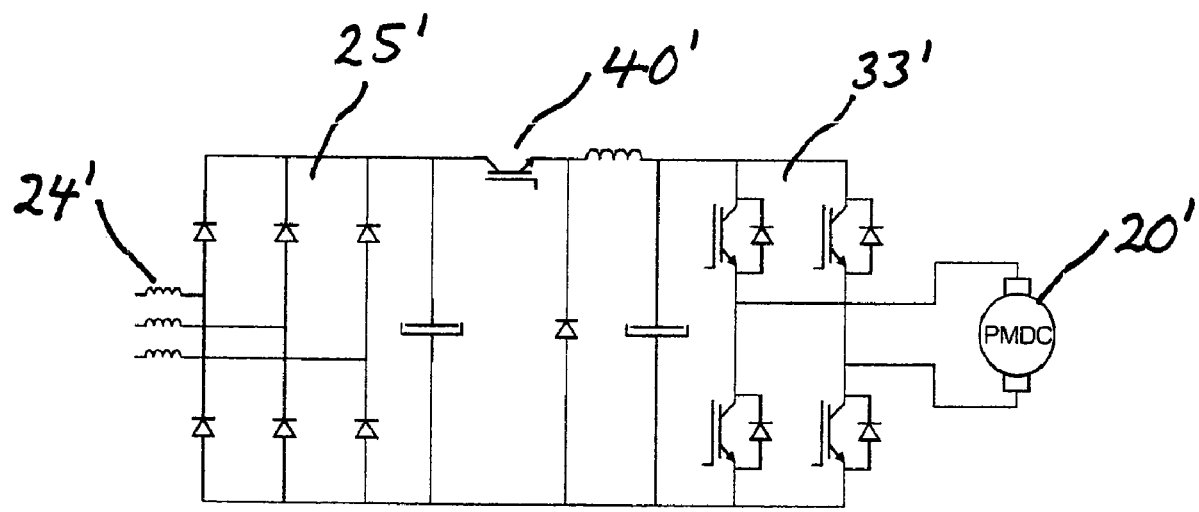
FIG. 7 is a view corresponding to FIG. 4 of a drive system according to another embodiment of the invention.

FIG. 7 is a view corresponding to FIG. 4 illustrating a part of a drive system according to another embodiment of the invention, in which a three phase alternating voltage 24' is connected to a passive rectifier 25' connected to a permanent excited DC motor 20' through a so-called buck converter 40' and a converter 33' feeding the electric motor 20'.

The invention is of course not in any way restricted to the embodiments described above, but many possibilities to modifications thereof will be apparent to a person with ordinary skill in the art without departing from the basic idea of the invention as defined in the appended claims.

Other types of electric motors than those shown above may be used and the type and number of the electronic components used in the drive system may of course be varied. Thus, the drive system may be adapted to be connected to a power supply of any type, such as DC, one phase AC and three phase AC.

The embodiment shown in FIG. 3 does not necessarily require a converter for delivering a voltage of a substantially constant level to the electric converter 33, but this may be omitted if the asynchronous motor 20 is constructed (wound) for the lowest possible voltage on the input of the converter 33 considering the possible power supply voltages of different customers.

There has not to be separate means for controlling the DC/DC-converter, but the control thereof may be implemented in the arrangement controlling the motor by controlling the electric converter.

The invention claimed is:

1. A drive system for operation of a tap changer for voltage regulation of a transformer on load, said system comprising:
   an electric motor connectible to a movable part of said tap changer for moving the movable part for carrying out a tap change operation,
   a connection configured to connect the electric motor to an electric power supply for an operation of the electric motor, a control arrangement configured to control the operation of the electric motor and, thereby operation of said tap changer, an electric converter for connection of said power supply to said electric motor, wherein said control arrangement is adapted to control said electric converter for controlling the operation of the electric motor, a detector adapted to detect movement of an output shaft of the electric motor and a position of a movable part of the tap changer, and a communicator adapted to send information from the detector to said control arrangement, wherein said control arrangement is computerized and configurable and customizable prior to commissioning and in use for enabling adaption of the drive system to different voltage levels of said power supply and to different properties of a tap changer to be operated by said drive system.

2. The system according to claim 1, wherein said control arrangement is configurable and customizable by being adapted to receive a customer specific parameter file with information about properties of a tap changer to be operated by said system.

3. The system according to claim 1, further comprising:
a DC/DC-converter connected between said power supply and said electric converter and
a control configured to control said DC/DC-converter, wherein said DC/DC-converter and said control are adapted to deliver a voltage of a substantially constant level to said electric converter substantially independently of the level of the voltage delivered by said electric power supply.

4. The system according to claim 3, wherein the system is adapted to be connected to said electric electrical power supply delivering a voltage of 90 VDC-400 VDC, and wherein said DC/DC-converter comprises a boost converter adapted to deliver a voltage of a substantially constant level.

5. The system according to claim 1, further comprising:
a Power Factor Correction converter connected between said power supply and said electric converter for ensuring that the system is tapping a smooth current from said electricity power supply.

6. The system according to claim 5, wherein said Power Factor Correction converter comprises said DC/DC-converter.

7. The system according to claim 1, wherein the system is adapted to be connected to an electric power supply delivering AC, the system further comprising:
a passive rectifier adapted to connect the system to said power supply.

8. The system according to claim 1, further comprising:
a measurer configured to measure a current and the voltage delivered to said electric motor,
a calculator configured to calculate an instantaneous power or torque needed and the energy consumption during a tap change operation,
storage configured to store the calculated values thus established and
a comparison unit configured to compare said calculated values with such stored corresponding values and based on the result of this comparison determine whether there is any need of maintenance of any movable parts of said tap changer.

9. The system according to claim 1, wherein said control arrangement is adapted to control said electric converter for controlling the electric motor to obtain a micro motion of a said movable part of the tap changer for checking the proper function of said system and/or tap changer.

10. The system according to claim 1, wherein the detector comprises a rotating sensor connected to an output shaft of said electric motor for determining the position of a said movable part of the tap changer, and wherein the rotating sensor is adapted to deliver information about said position to said control arrangement.

11. The system according to claim 8, wherein said rotating sensor comprises a resolver or an encoder.

12. The system according to claim 11, wherein said rotating sensor comprises a resolver connected to an output shaft of said electric motor so as to rotate substantially one turn while passing all possible tap change positions of the tap changer.

13. The system according to claim 1, wherein said electric motor comprises an AC motor.

14. The system according to claim 13, wherein said electric converter comprises a Voltage Source Converter.

15. The system according to claim 14, wherein said control arrangement is adapted to control the VSC-converter according to a Pulse Width Modulation pattern for delivering an alternating voltage driving or braking the electric motor.

16. The system according to claim 1, wherein said electric motor is a DC motor.

17. The system according to claim 16, wherein said electric converter is a Current Source Converter.

18. The system according to claim 1, wherein the system is adapted for operation of a tap changer for voltage regulation of a transformer on load having a rated power of at least 800 kVA and/or a rated voltage of at least 11 kV.

19. A method for carrying out tap change operations for voltage regulation of a transformer in a system for transmission or distribution of electric power, the method comprising:
providing a drive system for operation of a tap changer for voltage regulation of a transformer on load, said system comprising an electric motor connectible to a movable part of said tap changer for moving the movable part for carrying out a tap change operation, a connection configured to connect the electric motor to an electric power supply for an operation of the electric motor, a control arrangement configured to control the operation of the electric motor and, thereby operation of said tap changer, an electric converter for connection of said power supply to said electric motor, wherein said control arrangement is adapted to control said electric converter for controlling the operation of the electric motor, a detector configured to detect movement of an output shaft of the electric motor and a position of a movable part of the tap changer, and a communicator adapted to send information from the detector to said control arrangement, wherein said control arrangement is computerized and configurable and customizable prior to commissioning and in use for enabling adaption of the drive system to different voltage levels of said power supply and to different properties of a tap changer to be operated by said drive system; and
carrying out tap change operations utilizing the system.

20. The method according to claim 19, further comprising:
connecting said transformer to a generator of electric power, wherein said transformer is a part of a power plant.

21. The method according to claim 19, wherein said tap changer is for voltage regulation of a transformer in a high voltage power transmission system.

22. The method according to claim 21, wherein said power transmission system is designed for voltages of 50 kV-1000 kV.

23. The method according to claim 19, wherein said transformer is connected to a high power electric arc furnace.

24. The method according to claim 19, wherein said transformer is connected on load having a rated power of at least 800 kVA and/or a rated voltage of at least 11 kV.

25. The method according to claim 19, wherein said transformer is arranged in a switch gear for regulating power supply arriving thereto from a power transmission or distribution line or network.

26. An electric power plant comprising:
   a transformer, and
   a tap changer drive system comprising an electric motor connectible to a movable part of said tap changer for moving the movable part for carrying out a tap change operation, a connection configured to connect the electric motor to an electric power supply for an operation of the electric motor, a control arrangement configured to control the operation of the electric motor and, thereby operation of said tap changer, an electric converter for connection of said power supply to said electric motor, wherein said control arrangement is adapted to control said electric converter for controlling the operation of the electric motor, a detector configured to detect movement of an output shaft of the electric motor and a position of a movable part of the tap changer, and a communicator adapted to send information from the detector to said control arrangement, wherein said control arrangement is computerized and configurable and customizable prior to commissioning and in use for enabling adaption of the drive system to different voltage levels of said power supply and to different properties of a tap changer to be operated by said drive system.

* * * * *